United States Patent

[11] 3,582,153

| [72] | Inventor | Robert Hazell Pitcher<br>Leamington Spa, England |
|---|---|---|
| [21] | Appl. No. | 854,898 |
| [22] | Filed | Sept. 3, 1969 |
| [45] | Patented | June 1, 1971 |
| [73] | Assignee | Automotive Products Company Limited<br>Leamington Spa, Warwickshire, England |
| [32] | Priority | Sept. 6, 1968 |
| [33] | | Great Britain |
| [31] | | 42415/68 |

[54] FLUID PRESSURE BRAKING SYSTEMS FOR VEHICLES
5 Claims, 1 Drawing Fig.

[52] U.S. Cl. ............................................. 303/24,
137/45, 188/181, 303/3, 303/10, 303/21
[51] Int. Cl. .................................................. B60t 8/14,
B60t 13/68
[50] Field of Search .......................................... 303/21, 24,
6, 10, 3; 188/181, 152; 137/38, 45—46

[56] References Cited
UNITED STATES PATENTS
2,747,697 5/1956 Banker ........................ 303/21Ux

| 3,008,771 | 11/1961 | Moyer | 303/24 |
| 3,286,734 | 11/1966 | Hartshorne | 303/21X |
| 3,486,801 | 12/1969 | Frayer | 303/21 |

*Primary Examiner*—Milton Buchler
*Attorney*—Lawrence J. Winter

ABSTRACT: A control device for use in a fluid-pressure braking system of a vehicle to maintain a substantially constant rate of deceleration of the vehicle when the brakes are applied, the control device including a slide valve capable of connecting brake-operating motor cylinders selectively to a source of fluid pressure or to a drain, a spring arranged to be loaded by an operator controlled device to urge the slide valve to a position to connect the said motor cylinders to the pressure source, and a deceleration responsive member caused by deceleration of the vehicle to exert a force, depending on the rate of deceleration, opposing the spring load and therefore tending to connect the motor cylinders to the drain and so reduce the braking in accordance with the rate of deceleration.

PATENTED JUN 1 1971
3,582,153
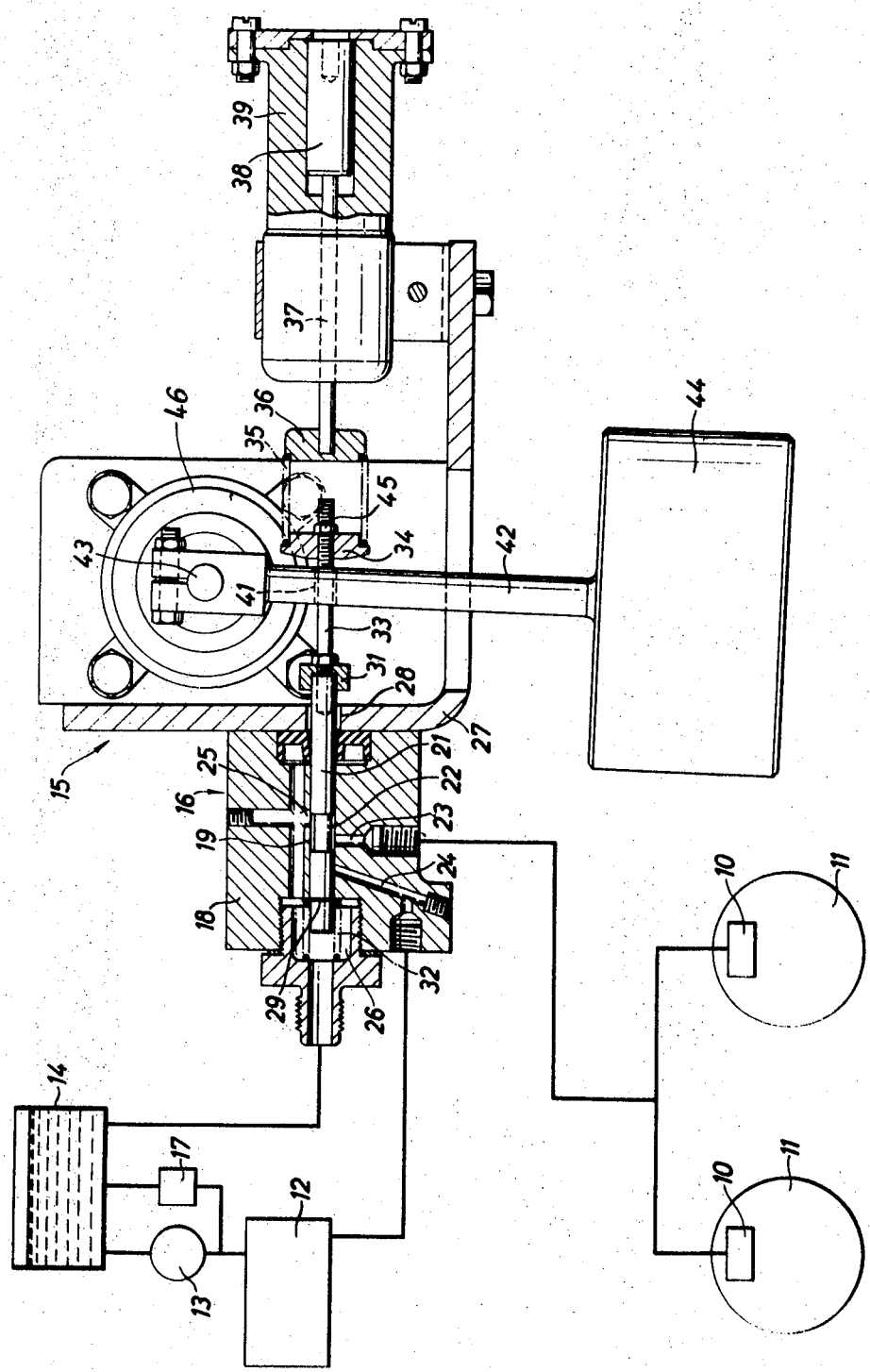
INVENTOR
Robert Hazell Pitcher
BY Lawrence K. Winter
ATTORNEY

FLUID PRESSURE BRAKING SYSTEMS FOR VEHICLES

This invention relates to fluid-pressure braking systems for vehicles, and has for its object to provide a control device for a fluid-pressure braking system capable of maintaining, when the vehicle brakes are applied, a substantially constant rate of deceleration provided that the vehicle is travelling on a substantially level surface.

According to the present invention, in a control device for a fluid-pressure braking system including motor cylinders to operate brakes on wheels of the vehicle and a source of fluid pressure connectable to said motor cylinders to apply the brakes, the said control device comprises in combination a slide valve adapted to connect the motor cylinders of a fluid-pressure braking system selectively to the pressure source or to the drain of said system, a valve-operating member, resilient means arranged between the movable member of said slide valve and said valve operating member, said valve-operating member being operative to produce a load in said spring acting to urge the valve movable member to a position in which it connects a pressure inlet to an outlet to the motor cylinders, and a deceleration responsive member arranged to exert on the valve movable member a force, depending on the rate of deceleration of a vehicle in which the control device is mounted, opposing the load in the spring.

The deceleration-responsive member is preferably a suspended weight.

The valve-operating member may be a solenoid.

The invention will now be described, by way of example, with reference to the accompanying drawing, the single FIGURE of which shows one embodiment of the invention, the control device being shown mainly in longitudinal section and other components of the braking system being shown diagrammatically.

Referring to the drawing, a liquid-pressure braking system includes motor cylinders 10, shown diagrammatically, operating brakes 11 on wheels of a vehicle, a liquid-pressure accumulator 12 in which liquid pressure is maintained by a pump 13 drawing liquid from a low pressure reservoir 14, and a control device, indicated generally by the reference 15, including a slide valve 16 capable of connecting the motor cylinders 10 selectively to the liquid-pressure accumulator 12 or to the low-pressure reservoir 14. A cut out valve 17 is provided, in the conventional manner, to direct the liquid delivered by the pump back to the reservoir 14 when the pressure in the accumulator 12 reaches a predetermined value.

The slide valve 16 comprises a body 18 in which is formed a valve bore 19 in which is slidable a valve spool 21 formed with a circumferential groove 22. A port 23 which, when the control device is connected into the braking system is connected to the brake motor cylinders 10, opens into the bore 19 so that, in all positions of the valve spool 21, it communicates with the groove 22. A second port 24, opening into the bore 19 at a position longitudinally spaced from the port 23, is connected to the liquid-pressure accumulator 12, and a third port 25, opening into the bore 19 at a position longitudinally spaced from the port 23 on the opposite side thereof to the port 24 is connected, through an end chamber 26 into which the valve bore 19 opens, to the low-pressure reservoir 14.

The slide valve body 18 is mounted on a bracket 27 adapted to be mounted on the structure of a vehicle, the valve spool 21 extending through an opening 28 in the said bracket. Longitudinal movement of the valve spool 21 in one direction is limited by a clip ring 29 on the valve spool engaging the end wall of the end chamber 26, and in the other direction by a head 31 on the valve spool engaging a surface of the bracket 27.

A spring 32 in the end chamber 26 acts on the clip ring 29 to urge the valve spool towards the position shown in the drawing, in which the clip ring 29 engages the end wall of the chamber 26 and the groove 22 connects the ports 23 and 25. Displacement of the valve spool 21 from the position shown shuts off the port 23 from the port 25 and connects the port 23 to the port 24.

A stem 33 fixed coaxially to the valve spool 21 at its end opposite to that on which the spring 32 acts carries a spring abutment 34, and a compression spring 35 is arranged between the abutment 34 and a second spring abutment 36 carried by a rod 37 arranged to be urged towards the abutment 34 by the armature 38 of a solenoid 39 when the said solenoid is energized.

The solenoid 39 is mounted on the bracket 27.

The stem 33 passes through a clearance hole 41 in an arm 42 carrying at its lower end a weight 44, the pivot axis of the arm 42 being transverse to the longitudinal axis of the vehicle in which the control device is mounted, so that inertia forces due to acceleration and deceleration of the vehicle tend to swing the arm and weight about the pivot at 43.

The direction of swing of the arm and weight resulting from deceleration is such that the arm engages the spring abutment 34 and exerts a force thereon opposing the spring 35. The arm 42 is mounted on the spindle 43 of a damper 46, so mounted on the bracket 27 that the said spindle is above the stem 33, and the damper 46 controls the swinging movement of the arm 42.

The spring abutment 34 is mounted on a screw-threaded portion of the stem 33 and is adapted to be held in position thereon by a locknut 45.

When no braking is required, the valve spool 21 is held by the spring 32 in the position shown in the drawing, so that the brake motor cylinders are connected to drain and isolate from the fluid-pressure source. To apply the brakes, the solenoid 39 is energized, compressing the spring 35 and causing it to apply a load to the valve spool 21 which moves the said spool to isolate the motor cylinders from the drain and connect them to the pressure source through the port 24. The application of the brakes causes deceleration of the vehicle, and the resulting inertia forces on the weight 44 cause it to swing in a direction to engage, and apply a load to, the spring abutment 34. This load partially counteracts the load of the spring 35 and tends to reduce the exposed area of the port 24 to control the pressure exerted in the brake motor cylinders and limit the rate of deceleration of the vehicle to a constant value determined by the characteristics of the springs 32 and 35 and the swinging weight assembly.

Any tendency of the rate of deceleration to change due to changes in brake performance such as, for example, fade, will modify the load exerted by the suspended weight 44 to adjust the position of the valve spool 21 and compensate for such change.

The valve-operating member, instead of being a solenoid, may be a liquid-pressure master cylinder or any other device such as a mechanical device, capable of loading the spring 35.

The fluid-pressure braking system has been described as a liquid pressure system in which the source of pressure is a liquid-pressure accumulator and the drain connection leads to a low pressure reservoir, from which liquid is drawn by a pump to maintain pressure in the accumulator. Alternatively, the said braking system may be an air-pressure system in which the source of pressure is a compressed air reservoir and the drain connection leads to the atmosphere.

I claim:

1. A control device for a fluid-pressure braking system including motor cylinders to operate brakes on wheels of a vehicle and a source of fluid pressure connectable to said motor cylinders to apply the brakes, wherein the said control device comprises, in combination, a slide valve adapted to connect the motor cylinders of a fluid-pressure braking system selectively to the pressure source or to the drain of said system, a valve-operating member, resilient means arranged between a movable member of said slide valve and said valve-operating member, said valve-operating member being operative to produce a load in said spring acting to urge the valve movable member to a position in which it connects a pressure inlet to an outlet to the motor cylinders, and a deceleration responsive member arranged to exert on the valve movable member a force depending on the rate of deceleration of a vehicle in which the control device is mounted, opposing the load in the spring.

2. A control device according to claim 1, wherein the deceleration responsive member is a suspended weight.

3. A control device according to claim 1 or 2, wherein the valve-operating member is a solenoid.

4. A fluid-pressure braking system including a control device according to claim 1, wherein the braking system is a liquid-pressure system.

5. A fluid-pressure braking system including a control device according to claim 1 wherein the braking system is a compressed air system.